United States Patent
Welles

(10) Patent No.: US 11,903,371 B2
(45) Date of Patent: Feb. 20, 2024

(54) HARMONICALLY TUNED FISHING ROD FOR DISTANCE CASTING AND METHOD OF MANUFACTURE THEREOF

(71) Applicant: Douglas Outdoors LLC, Phoenix, NY (US)

(72) Inventor: Andrew Voss Welles, Horseheads, NY (US)

(73) Assignee: Douglas Outdoors LLC, Phoenix, NY (US)

( * ) Notice: Subject to any disclaimer, the term of this patent is extended or adjusted under 35 U.S.C. 154(b) by 0 days.

(21) Appl. No.: 18/074,986

(22) Filed: Dec. 5, 2022

(65) Prior Publication Data

US 2023/0108420 A1    Apr. 6, 2023

Related U.S. Application Data

(62) Division of application No. 16/430,508, filed on Jun. 4, 2019, now Pat. No. 11,543,288.

(60) Provisional application No. 62/684,053, filed on Jun. 12, 2018.

(51) Int. Cl.
  *A01K 87/04* (2006.01)
  *G01H 13/00* (2006.01)

(52) U.S. Cl.
  CPC ............. *A01K 87/04* (2013.01); *G01H 13/00* (2013.01)

(58) Field of Classification Search
  CPC .............................. A01K 87/04; G01H 13/00
  See application file for complete search history.

(56) References Cited

U.S. PATENT DOCUMENTS

| | | | | |
|---|---|---|---|---|
| 4,700,501 A | * | 10/1987 | Bryan ................. | A01K 91/065 43/25 |
| 6,092,324 A | * | 7/2000 | Lepage ................. | A01K 87/00 43/18.1 R |
| 2020/0060250 A1 | * | 2/2020 | Russell ............... | A01K 87/007 |

OTHER PUBLICATIONS

Parker et al. (Fishing Rod Guide Placement), Worcester Polytechnic Institute. Available at https://Aweb.wpi.edu/Pubs/E-project/Available/E-project-042915-105227/unrestricted/Fishing_Rod_Guide_Placement_FINAL.pdf (Year: 2015).*

* cited by examiner

*Primary Examiner* — Benjamin R Schmitt
(74) *Attorney, Agent, or Firm* — Barclay Damon LLP

(57) ABSTRACT

A fishing pole including a handle and a seat that is integrated with the handle and structured to engage a line reel supporting a fishing line disposed about a spool of the line reel. The fishing pole further includes a flexible rod connecting to the handle and extending axially along an elongate axis. The flexible rod is structured to cast a fishing line a distance from the spool of the line reel. The flexible rod further includes at least two node locations. A plurality of rod guides are aligned with each of the at least two node locations and are operative to mitigate mechanical interaction with, and frictional drag on, the fishing line as it passes through each of the rod guides.

10 Claims, 4 Drawing Sheets

HARMONICALLY TUNED FISHING ROD FOR DISTANCE CASTING AND METHOD OF MANUFACTURE THEREOF

RELATED APPLICATIONS

This application is a divisional application of non-provisional utility patent application Ser. No. 16/430,508, filed on Jun. 4, 2019, which claims the benefit and priority of, U.S. provisional patent application No. 62/684,053, filed on Jun. 12, 2018 entitled: "HARMONICALLY TUNED FISHING ROD AND METHOD OF MANUFACTURE THEREOF." The entire contents of such applications are hereby incorporated by reference.

TECHNICAL FIELD

This disclosure relates to sport fishing, and more particularly, to a new and useful fishing rod and method of manufacture which optimally locates the line guides of the rod for improved distance casting.

BACKGROUND

As with any sporting endeavor, a professional sportsman relies on a variety of intellectual and athletic skills. In the sport of fishing, these skills are tested in tournaments by the number and/or pounds of fish caught within a particular time frame. With respect to intellectual skills, a professional angler: (i) selects the most appropriate lure/bait for the conditions; (ii) employs the most appropriate tackle; (iii) chooses the optimum time of day as may be influenced by tidal or sunlight conditions (e.g., high tide, low tide, dusk, dawn, etc.) and (iv) knows how weather conditions, such as rain, wind and temperature influence his/her chances of catching fish. Additionally, the professional angler studies the various types and bodies of water, e.g., fresh, salt, brackish condition within the various ponds, streams, rivers and oceans to gain an appreciation for these bountiful resources. More specifically, the angler gains an appreciation for, inter alia: (i) how deep/shallow to set the bait, (ii) whether to use live, fresh, or simulated bait (e.g., rubber worms, decorated lures, etc.) (iii) when to drop a line, cast or troll for a particular fish; and (iv) how to catch and release without harming the fish.

As far as athleticism, the professional angler prides himself on a number of skills which are only acquired after many hours of repetition and training. These include the ability to: (i) accurately place a lure at a desired location, i.e., near underwater structure such as a shelf or fallen-tree; (ii) quickly drop bait within reach, or the-line-of-sight, of a fish/school of fish; or (iii) cast a specific distance thus allowing a lure to be placed into an area which may be, otherwise, unreachable or unattainable without the use of, for example, rubber waiters or a small fishing vessel. The foregoing relates broadly to the category of casting skills, however, it should be appreciated that there are other skills required for "presentation" of bait, wherein an angler must master the art of imparting action to the line so as to make a lure/bait visible and/or alluring to a fish.

Of the above-identified skills, perhaps one of the most recognized or highly regarded skills, relates to distance casting. Pendulum, surf and fly casting tournaments have been around for nearly a century, i.e., beginning in the early 1920's. Anglers have achieved distances greater than two football fields, end-to-end, for a distance of six-hundred and seventy-three (673 ft) feet i.e., representing a current casting record. Consequently, any advantage that an angler can achieve in the art of distance casting is highly sought after.

Additionally, any technology which improves accuracy while reducing fatigue is similarly important to a fishing advocate. That is, a fishing rod which delivers distance with less effort is particularly welcome.

A need, therefore, exists for fishing gear capable of delivering greater casting distances.

SUMMARY

Figure 1:
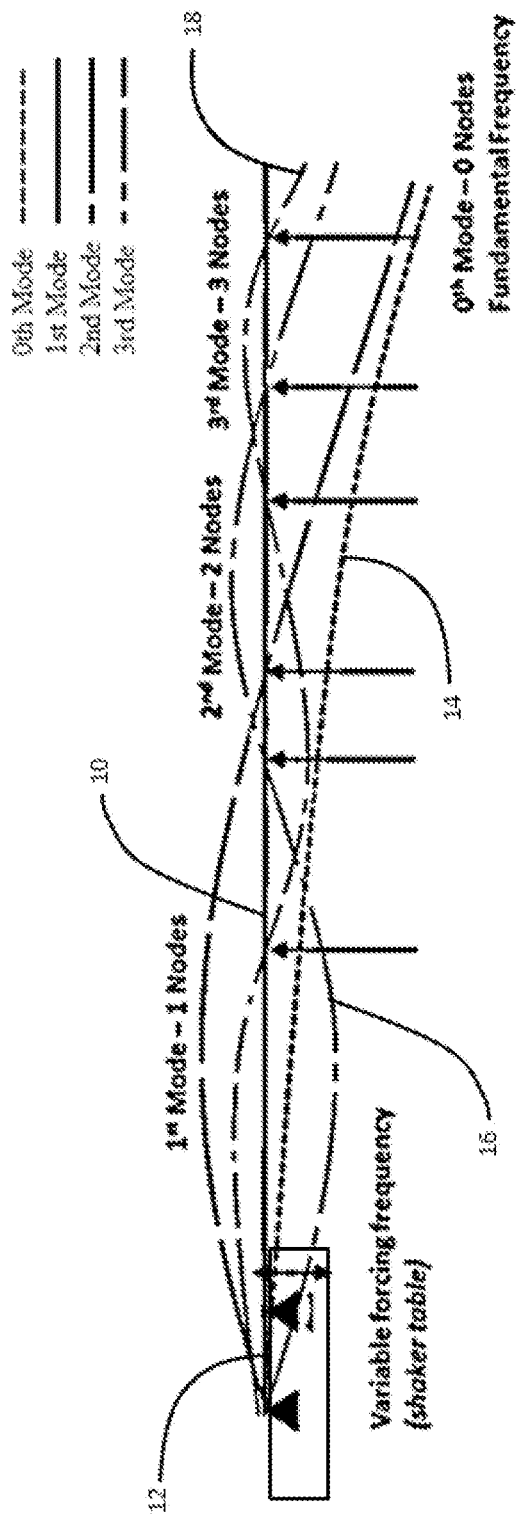
FIG. 1 is a schematic view of a fishing rod mounted to a table top including an oscillatory shaking device to determine the node location of each higher order harmonic associated with the fishing rod.

The disclosure describes a new and useful fishing rod and method for its fabrication The pole of the fishing rod comprises: (i) a handle; (ii) a seat integrated with the handle and configured to engage the feet of a line reel; and (iii) a flexible rod portion connecting to the handle and extending axially along an elongate axis. The flexible rod portion includes a plurality of node locations; and (iv) at least two rod guides configured to align with respective node locations along the flexible rod portion. The location of the rod guides minimizes transverse motion thereof so as to mitigate mechanical interaction/frictional drag with the fishing line as it passes through each of the rod guides. Consequence, distance casting is decidedly improved.

The method includes the steps of: (i) inducing a vibratory force transversely of the elongate axis to identify node locations associated with one or more rod harmonics along the length of a flexible rod, and (ii) placing line guides proximal to each of at least two node locations for receiving fishing line. The node positions minimize the relative motion of the rod/line guides relative to the fishing line when casting to minimize line drag and maximize rod damping.

Furthermore, the fishing pole optimizes casting distance while increasing the energy transferred from the pole to the fishing line/lure/bait.

DETAILED DESCRIPTION

Greater distances associated with casting may be achieved by variety of methods including: (i) an angler's technique, (ii) the mechanics of the fishing rod, and/or (iii) a combination of both technique and rod mechanics. With respect to the former, an angler may be taught to combine the motion of his/her hips, shoulders, arms and wrist to impart greater energy to the rod during a cast. With respect to mechanics, a rod may be designed with enhanced properties (e.g., spring rate) to increase the tip speed of the rod during a cast/upon delivery. Alternatively, the loss of energy may be mitigated to enhance the distance achievable by a cast. The latter is the subject of this disclosure.

Tournament masters advise students of fly fishing to maintain a degree of tension on the line during delivery such that with each reversal of the rod additional energy may be imparted to the next stroke. While this may be true, the inventors learned that yet another variable augments the import of this teaching. This variable relates to the passage of fishing line through the line guides, and, more particularly, to the impact that mechanical and frictional forces can have on the fishing line as it passes through the line guides. While we can all envision how a slack line might frictionally engage a guide as the line passes through the line guide, the inventors chose to look more closely at the relationship between the line guides and frictional drag incurred as the line impacts the guide.

Historically, the distance between line guides was determined, in great part, on the aesthetics of the placement of the line guides. Commonly, the length between guides was either equidistant, e.g., from a centrally located guide to one at the tip end and to one at the root end, or logarithmic, e.g., increasingly larger spacing between line guides from the tip end to the root end. The inventors looked at the transverse motion of the guides, and how casting distance was affected by the mechanical and frictional engagement of the rod guide with the fishing line.

More specifically, the invention employs an iterative method of locating resonant nodes associated with each design configuration offered by an original equipment manufacturer (OEM). Thereafter, the fishing rods are manufactured according to a specification determined by the inventive method. Inasmuch as OEMs of particularly popular brands can have many different model variations, e.g., the assignee of the present application offers as many as one-hundred and ninety (190) different fishing rod configurations, the method of the present invention may be performed for each of these configurations to develop the guide locations for each of its fishing rods.

The method of the present disclosure determines where, along the elongate axis of the flexible rod, are the node locations, i.e., or the inflexion points, where, in theory, the fishing rod is static or experiences a minimum transverse motion. The node locations, also referred to as the fundamental 1st, 2nd, 3rd . . . to the Nth order harmonic frequencies, may be found by vibrating the rod at increasingly higher frequencies. When resonating at a particular natural frequency, a standing wave is established along the elongate axis of the rod, the shape of this wave-function is an eigen-mode corresponding to a particular eigenvalue. That is, each mode shape has certain stationary node locations about which the rest of the rod vibrates. These node locations are determined by the mass and stiffness distribution along the length of the flexible rod.

FIG. 1 is a schematic view of a fishing rod 10 mounted to a variable forcing frequency shaker table 12. The table top 12 may be attached to an eccentric mass to oscillate the table at the frequency of the rotating mass. FIG. 1 shows the fundamental, 1st. 2nd, and 3rd order harmonic modes as a: (i) dashed, (ii) long-dashed, (iii) short-long dashed, and (iv) double-dashed lines, respectively. Since the addition of each guide adds additional mass and stiffness, the location of each node will vary with the addition of each guide. For example, the location of the 1st order harmonic node location, identified by the long-dashed line, will change upon adding the first and second guides (each harmonic producing two node locations). Similarly, the location of the 1st and 2nd order harmonic frequency changes upon adding the first, second, third and fourth guides. Similarly, the location of the 1st, 2nd, and 3rd order harmonic nodes changes upon adding the first through the sixth guides. As a consequence, the method is best performed using an iterative process. It will be appreciated that the location of the first through the sixth guides can be established by evaluating the rod or beam using an eigenvalue analysis of the governing equations and performing a shake test on the rod in an effort to locate each of the node locations.

Figure 2:
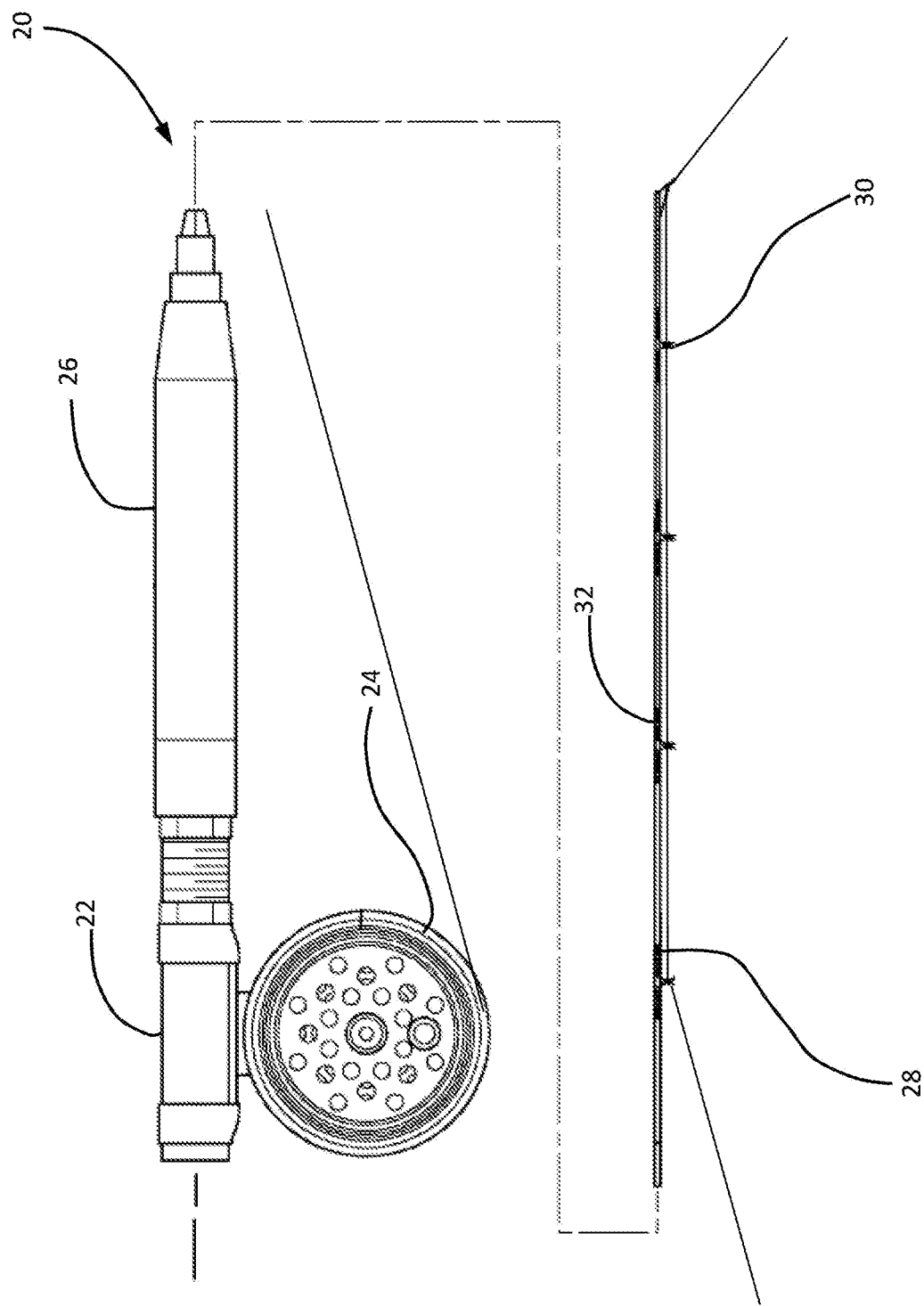
FIG. 2 depicts a fishing rod having a reel seat for mounting the feet of a fishing reel, a rod end projecting axially along an elongate axis, and a handle grip disposed therebetween.
Figure 3:
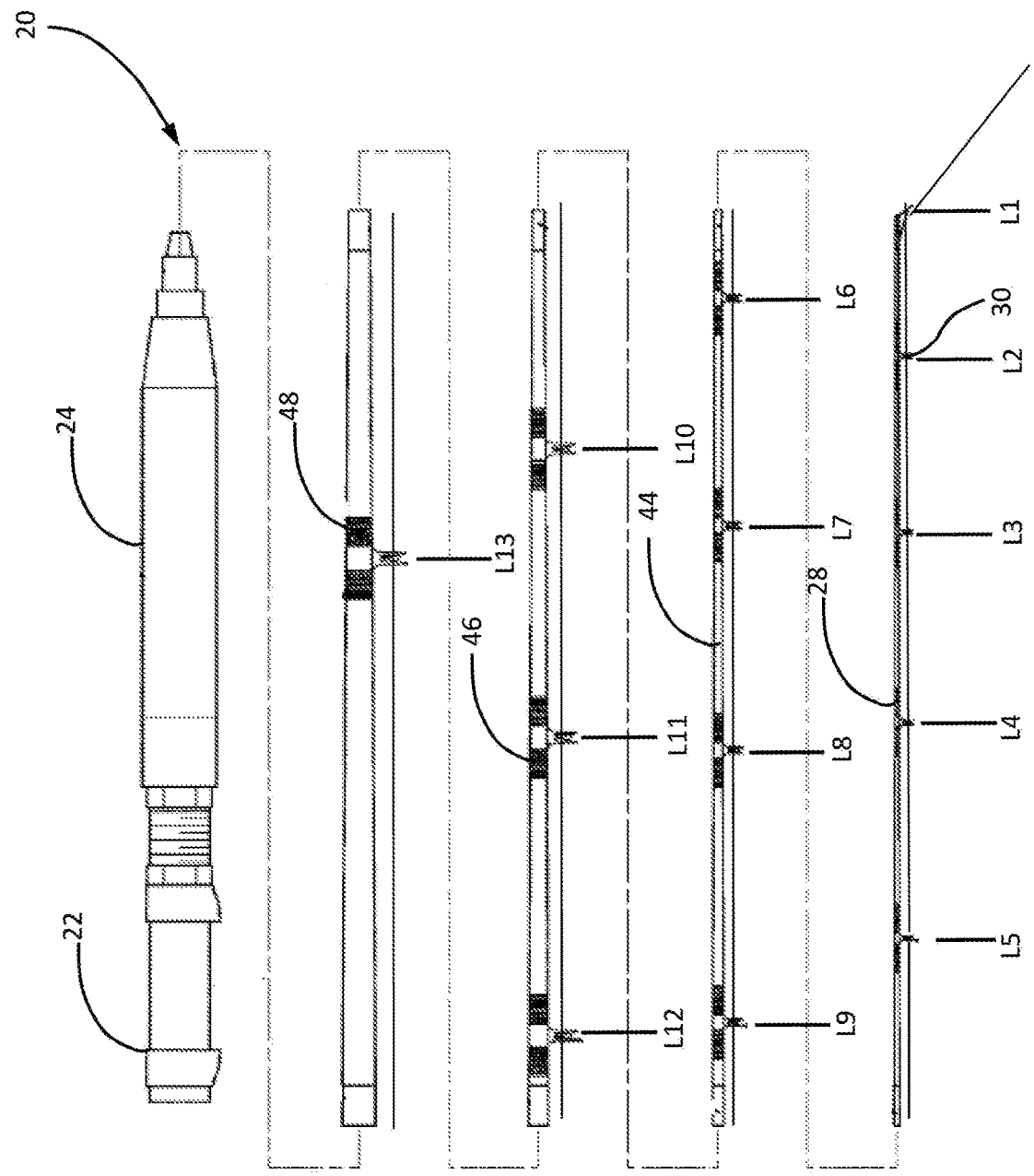
FIG. 3 depicts the fishing rod with the reel removed along with the addition of one or more rod extensions for distance casting.

FIGS. 2 and 3, depict an exemplary fishing rod 20 which is extensible by the addition of several mating rod sections. FIG. 2 depicts a rod 20 having a reel seat 22 for mounting a line reel 24. The line reel 24 has, wrapped about its center spool, fishing line for fly fishing. A handle grip portion 26 is integrated with the reel seat 22 and includes a forward end for receiving the root end portion of a fishing rod 28. The fishing rod 28 includes five (5) line guides 30 which are mounted/wrapped to the rod 28 at select node locations to minimize relative motion between a fishing line as it passes through each of the line guides 30. FIG. 3 depicts the same reel seat 22 and handle grip portion 26 along with three intermediate rod sections 44, 46, and 48 which add eight (8) additional guides 30. These additional line guides 30 may be mounted to correspond with the approximate location of the maximum amplitude of each eigen-mode and to provide an aesthetically pleasing appearance.

In the described embodiment, a reciprocating actuator induces a variable forcing frequency immediately upstream of the rod mount. While a reciprocating actuator may be used to induce vibratory forces, any one of a variety of vibratory actuators may be employed. Initially, a low forcing frequency, i.e., from about three to about six cycles/second (3-6 Hz), is used to establish a fundamental frequency. The forcing frequency is then increased to between about nine to about twelve cycles/second (9-12 Hz) to establish the first node location L1, i.e., the first location associated with the first mode, or first harmonic value of the rod 20. Accordingly, the first line guide 30 (or mass equivalent of the first guide) is placed at the first node location L1.

With the first guide 30 in place, the forcing frequency is once again increased. This time, the vibratory force is increased to between about seventeen cycles/second (17 Hz) to about twenty-three cycles/second (23 Hz) to establish the first, second and third node locations L1-L3 associated with the first and second modes, or first and second harmonic values of the rod 20, respectively. In this iteration, the first node L1 location may have changed from its earlier position. Next, the first guide 30 is moved to its new position while second and third guides 30 are added to correspond to the second and third node locations L2 and L3.

With the first, second and third guides 30 in place, the forcing frequency is increased to between about thirty-two cycles/second (32 Hz) to about thirty-eight cycles/second (38 Hz) to establish the fourth, fifth and sixth node locations L4, L5, L6 of the flexible rod, respectively. Once again, the first, second and third nodes L1, L2, L3 locations may have changed from their earlier positions while the fourth, fifth and sixths guides 30 are moved into the fourth, fifth and sixth node locations L4, L5, L6. These node locations are associated with the first, second and third modes or first, second and third harmonic values of the rod 20. The remaining guides 30 are mounted along the length of the rod 20 to correspond with the approximate location of the maximum displacement amplitude locations L7, L8, L9, L10 of each eigen-mode (and to provide a pleasing aesthetic.)

Typically a frequency resolution of 0.1 Hz is required to identify these frequencies. With reference to FIG. 1, the mapping of frequency to nodes is as follows: (i) fundamental no node, rod is just 'flapping', (ii) the first harmonic provides the location of the first node, L1, (ii) the second harmonic provides the location of the next two nodes L2 and L3, (iii) the third harmonic gives the location of the next three nodes L4, L5 and L6, and (iv) fourth harmonic give the location of nodes L7, L8, L9 and L10. With respect to item (iv), the fourth harmonic may be used for long rods such as a fourteen foot, two handed casting rod. Typically, only the first three harmonics are measured.

Further, placing the intermediate guides at or near the location of maximum amplitude for a particular wave function has the effect of optimally damping the resonating structure. This damping effect significantly improves the recovery of the rod upon completion of a cast and contributes to improved casting distance and accuracy.

Figure 4:
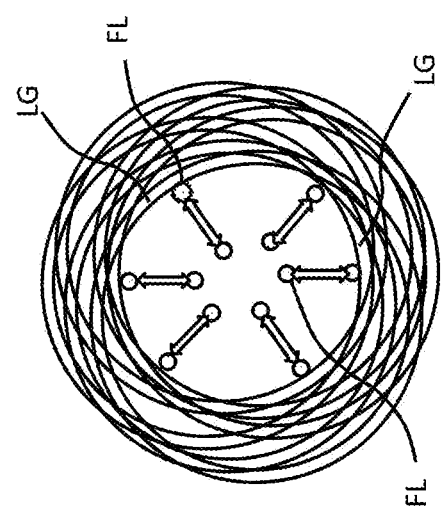
FIG. 4 depicts the transverse motion of a conventional fishing guide and fishing line as it passes through the fishing guide.

FIG. 4 depicts the transverse motion of a prior art fishing line FL passing through a conventional fishing guide FG which has not been optimized for distance casting. It will be appreciated that the mechanical interaction and frictional engagement of the fishing line FL produces significant line drag resulting in reduced distance casting.

Figure 5:
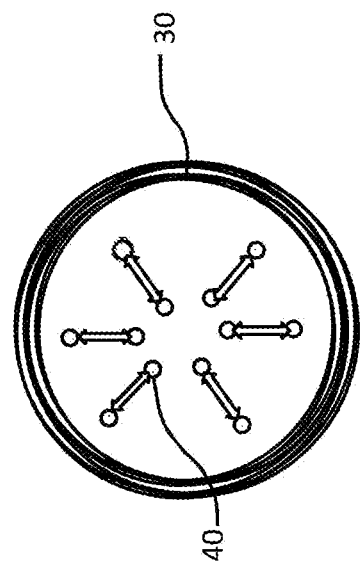
FIG. 5 depicts a fishing rod optimized for distance casting, energy transfer and efficiency.

FIG. 5 depicts a fishing guide optimized for distance casting. While the fishing line will move in and out in the direction of the arrows, the guide 30 remains essentially stationary thereby mitigating mechanical interaction and frictional engagement of the fishing line 40 with the guide 30. That is, with the line guides stationary, or nearly stationary, the fishing line 40 will pass unobstructed or without contacting the line guides. As a consequence, the authors have found that casts of an additional 10 to 30 yards are possible.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The attached Appendix is a power point presentation which describes the method for locating each of the guides in greater detail.

The invention claimed is:

1. A fishing pole optimized for distance casting, comprising:
   a handle;
   a seat integrated with the handle and configured to engage a line reel for supporting fishing line wrapped around a spool of the line reel; and
   a flexible rod configured to cast the fishing line from the line reel, the flexible rod connecting to the handle and including at least two node locations disposed axially along an elongate axis of the flexible rod, and
   a plurality of rod guides mounting to the flexible rod, at least two of the rod guides each disposed at one of the at least two node locations.

2. The fishing pole of claim 1, wherein the flexible rod has a tip end corresponding to one of the at least two node locations and a rod guide disposed at the tip end.

3. The fishing pole of claim 2, wherein the at least two nodes locations are disposed inboard of the tip end, and wherein a rod guide is disposed at each node location.

4. The fishing pole of claim 2, wherein a rod guide is disposed at each node location of the flexible rod.

5. The fishing pole of claim 1, wherein rod guides mitigate mechanical interaction and frictional drag as the fishing line passes through the rod guides.

6. The fishing pole of claim 1, wherein the node locations are determined by higher harmonic shake testing.

7. A fishing pole, comprising:
   a handle;
   a seat integrated with the handle and configured to engage a line reel supporting a fishing line disposed about a spool of the line reel; and
   a flexible rod connecting to the handle and extending axially along an elongate axis, the flexible rod configured to cast a fishing line a distance from the spool of the line reel, and including at least two node locations; and,
   a plurality of rod guides disposed at each of the at least two node locations and operative to mitigate mechanical interaction with, and frictional drag on, the fishing line as it passes through each of the rod guides.

8. The fishing pole of claim 7, wherein the flexible rod has a tip end corresponding to one of the node locations.

9. The fishing pole of claim 7, wherein the at least two node locations includes a first node location at the tip end of the flexible rod and second and third node locations inboard of the tip end.

10. The fishing pole of claim 9, wherein the plurality of rod guides are disposed at the first, second and third node locations.

* * * * *